June 2, 1959  A. JORGENSON ET AL  2,888,888
BAKERY GOODS MAKING METHOD Filed Oct. 15, 1956  5 Sheets-Sheet 1

INVENTORS
GERALD A. JORGENSON
CLARENCE A KIEFFABER
MERLIN A. STICKELBER
BY Alfred R. Fuchs
ATTORNEY June 2, 1959  A. JORGENSON ET AL  2,888,888
BAKERY GOODS MAKING METHOD Filed Oct. 15, 1956  5 Sheets-Sheet 2

INVENTORS
GERALD A. JORGENSON
BY CLARENCE A. KIEFFABER
MERLIN A. STICKELBER

Alfred R. Fuchs
ATTORNEY

Fig. 5

INVENTORS
GERALD A. JORGENSON
CLARENCE A. KIEFFABER
MERLIN A. STICKELBER
BY Alfred R. Fuchs
ATTORNEY June 2, 1959     A. JORGENSON ET AL     2,888,888
BAKERY GOODS MAKING METHOD Filed Oct. 15, 1956     5 Sheets—Sheet 5

INVENTORS
GERALD A. JORGENSON
CLARENCE A. KIEFFABER
BY MERLIN A. STICKELBER

Alfred R. Fuchs
ATTORNEY

United States Patent Office 2,888,888
Patented June 2, 1959

2,888,888

BAKERY GOODS MAKING METHOD

Gerald A. Jorgenson, Racine, Wis., Clarence A. Kieffaber, Overland Park, Kans., and Merlin A. Stickelber, Kansas City, Mo., assignors to Stickelber & Sons, Inc., a corporation of Missouri Application October 15, 1956, Serial No. 616,100

6 Claims. (Cl. 107—54)

Our invention relates to the method of making bakery products, and is particularly adapted for making the type of bakery products known as sweet goods. In the specific embodiment shown and described herein the method is particularly adapted for the making of cinnamon rolls.

In the machine manufacture of cinnamon rolls in commercial bakeries it has been necessary to feed proofed dough to sizing and sheeting rollers to form the dough into a continuous ribbon-like strip or band, applying coating and flavoring ingredients to one surface of the ribbon of dough, coil it up on itself transversely, and then sever or cut the coil into short lengths to produce the cinnamon rolls. In order to form a continuous ribbon of dough for this purpose it has been customary to supply crudely formed elongated masses of proofed dough to the sheeting and sizing rollers and by manual operation, join succeeding such elongated masses of dough to each other so as to produce a continuous band of dough. In joining such succeeding elongated masses of dough to each other, it is necessary to lap these. The lapping of the dough produces a widening of the band of dough at the places where the dough was lapped as it passes through the sheeting means, which makes it impossible to produce a continuous band of dough that is of absolutely uniform width and thickness.

In making cinnamon rolls the band or strip of dough is coiled up on itself and cut into lengths to produce the finished product. In order that the resulting rolls be accurately scaled to uniform size it is necessary that the continuous strip or band of dough formed from the elongated masses connected together as above pointed out be of uniform width and thickness. In an attempt to eliminate the undulations in the band or strip of dough formed from such masses of dough introduced into such a machine as above referred to, it has been necessary to pass the band of dough through a plurality of sizing and sheeting roller mechanisms, which decrease but do not eliminate such undulations. This has made it necessary to have machines for making such products as cinnamon rolls that occupied a large amount of space and included a large number of sheeting devices, which worked the dough an undesirable amount.

It is a purpose of our invention to provide a method of making bakery products, of the above referred to character, that eliminates the proofing of the dough and the large number of sheeting or rolling operations previously necessary and, which, at the same time provides a product that will keep fresh longer than similar products made by previously known methods and apparatus. In order to accomplish this purpose our invention involves the continuous withdrawal of a stream of raw dough from a mass thereof as it comes from the mixer and feeding it to extruding means in such a manner that a continuous wide, flat band of dough of uniform width and thickness and of substantially uniform texture is extruded, which is of a much greater width than thickness, the thickness and width thereof approaching that desired for coiling or performing other operations thereon to form the bakery product. Said extruded, wide, flat band of raw dough produced by our method is of such a uniform thickness and width that only an amount of uniform rolling pressure is applied thereto necessary to make the band of uniform texture and of the width and thickness desired for producing cinnamon rolls or other products. While our invention is particularly adaptable for the manufacture of cinnamon rolls, it is also adaptable for use in producing other bakery products, particularly, other sweet goods.

In order to accomplish the purposes of our invention it is necessary that the raw dough be fed from the mass thereof, that comes from the dough mixer, in such a manner without punishing the dough, that the stream of dough passing from the mass to the extrusion nozzle is continuous and uniform, and at a uniform pressure upon reaching the nozzle, without any possibility of any air pockets or other voids occurring therein, that would cause irregularity in the cross sectional dimensions of the ribbon of dough discharged from the extrusion nozzle. A uniform feed of the dough to the extrusion nozzle is accomplished by assuring that no pockets or voids exist in the moving stream of dough being fed and that undue agitation of the dough is avoided in feeding it to the extrusion means. It has been found that, to accomplish such uniform and complete filling of said space with dough, it is necessary to utilize suction for drawing the raw dough from the mass thereof into the feeding apparatus.

One of the great advantages of our invention is that, in the feeding of the raw dough under the pressure produced in pushing the dough through the extrusion nozzle and discharging the same from said nozzle, the change in pressure that occurs produces a homogenizing action on the dough that breaks down the starches to an extent not previously accomplished, in previously used methods of making such bakery products, and as a result the absorption of the dough can be increased up to approximately one percent. As a result the product of our method and apparatus remains fresh for many more days than has been possible by previous methods. By absorption is meant the amount of water that can be added to the dough in proportion to the amount of flour therein. One percent more absorption means that one more pound of water can be used in the dough for each 100 pounds of flour than was previously possible.

As the mass of raw dough that is fed to the extrusion nozzle is extremely sticky, due to the fact that it is used immediately after mixing, without allowing it to proof, dusting flour is applied to both faces of the continuous band of dough discharged from the extrusion nozzle to permit such flattening and sheeting thereof as is required to produce a continuous band of dough of the desired uniform width, thickness and texture. Even though the surfaces of the band of dough so produced are floured, such a band of dough is of such a sticky character that it would adhere to a flattening or sheeting roller of metal and consequently it has been found essential that the flattening and sheeting rollers that act on the band of extruded dough be provided with an outer surface covering of a polymer of tetrafluoroethylene, being of the character disclosed in the patent to Stickelber, 2,699,737, on Dough Sheeting Apparatus, patented January 18, 1955.

Our improved method not only eliminates much equipment that occupies a large amount of space, but also eliminates steps such as proofing, manually joining masses of dough together and repeated sheeting of the dough, the elimination of which greatly speeds up the process from the mixing of the dough to the product ready for baking. A better product, more uniform in texture and size and of better keeping qualities than obtained by previously practiced methods is produced.

Other objects and advantages of our invention will appear as the description of the drawings proceeds. We desire to have it understood, however, that we do not intend to limit ourselves to the particular details shown or described, except as defined in the claims.

Figure 1:
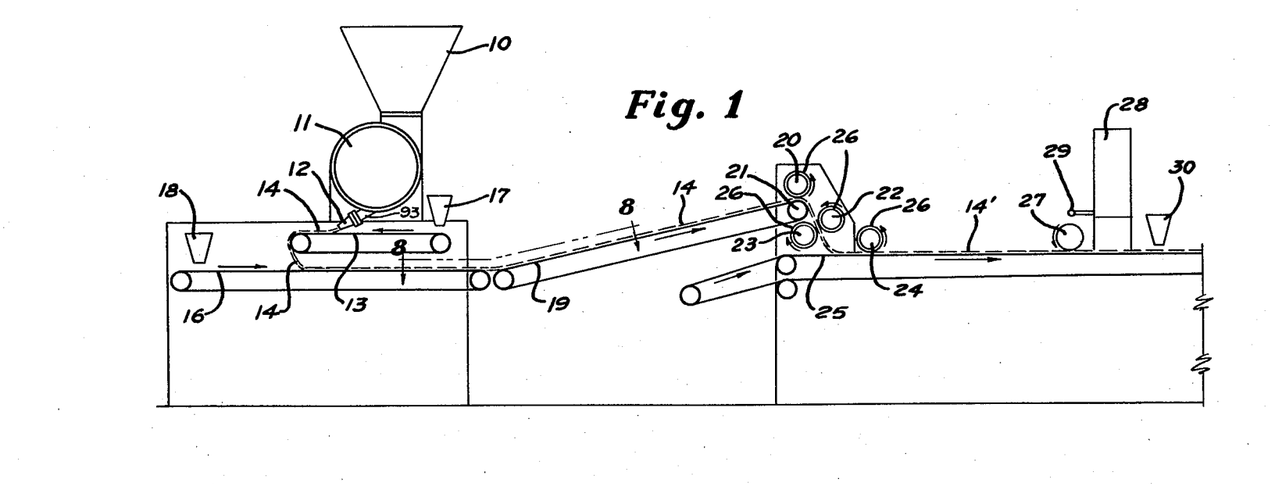
Fig. 1 is a diagrammatic view in side elevation of the major portion of the apparatus utilized for carrying out our improved method of making bakery products, the particular form of apparatus illustrated being adapted for the making of cinnamon rolls.
Figures 1A, 8:
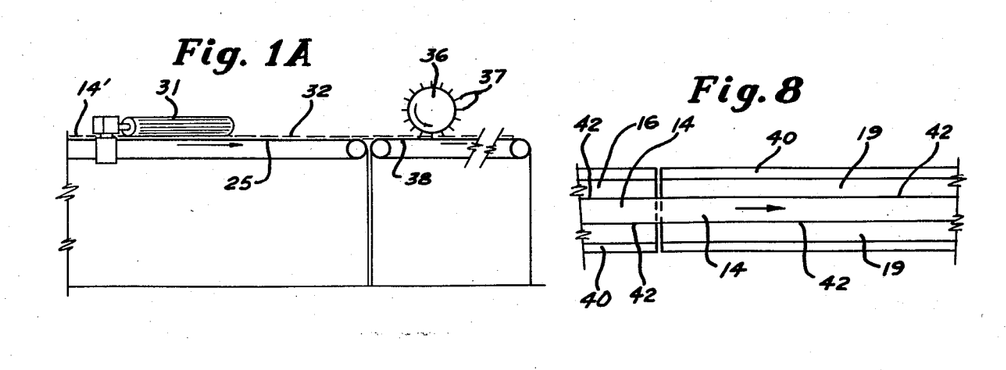
Fig. 1A is a similar view, showing the continuation of the apparatus shown in Fig. 1 at the right hand end thereof, partly broken away.
Fig. 8 is a fragmentary plan view taken substantially on the line 8—8 of Fig. 1.

Referring in detail to the drawings, an apparatus for carrying out our improved method for the manufacture of such bakery products as are commonly referred to as sweet goods, is illustrated diagrammatically in Figs. 1 and 1A as being particularly adapted for the manufacture of cinnamon rolls. In our improved apparatus the hopper 10 is provided for receiving raw dough from a mixer for supply to a feeding device 11, which is provided with an extrusion nozzle 12 that deposits a wide, flat band of raw dough of uniform width and thickness at a uniform rate on a conveyor belt 13, which is driven at a uniform rate in a well known manner so that the upper run thereof travels in the direction indicated by the arrow in Fig. 1. Said band of raw dough is continuous in character and, due to the character of the feeding means 11, is supplied at a uniform rate to the extrusion nozzle 12, and as it is raw dough that is being extruded, the band 14 of such raw dough shown in Fig. 1 in dotted lines is extremely sticky on all faces thereof as it leaves the extrusion nozzle.

Figure 9:
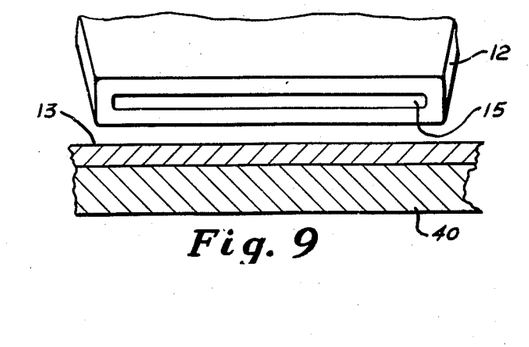
Fig. 9 is a fragmentary detail view taken on the line 9—9 of Fig. 5, the band of dough being extruded being omitted.

The extrusion nozzle has a discharge orifice 15 of a slot-like character, with the length thereof extending crosswise of the conveyor belt 13 and the width thereof being equal to the thickness of the continuous band of dough 13 extruded therefrom, the discharge orifice being shown in Fig. 9 of the drawings. It will be obvious that dough extruded from the nozzle 12 through the orifice 15 will, if supplied at a uniform rate and at a uniform pressure to said orifice, cause to be extruded a band of dough of uniform width and thickness, and that the width of the band will be much greater than the thickness thereof. Said band could thus be referred to as a wide, thin band of dough, even should it not be extremely thin, because of the relatively great width thereof as compared with the thickness thereof.

It has been found, that in the production of certain products by our improved method, the extruded band 14 can vary from approximately ⅜ inch to ¼ inch in thickness, and from 7 inches to 9 inches in width, and can even be up to ½ inch thick and as little as 4 inches in width for certain other products that are capable of being produced by our method. The conveyor belt 13 preferably travels at a rate that is approximately that at which the band of raw dough 14 is being extruded from the nozzle 12. If it is desired to reduce the cross section of the band from that which it has at the extrusion nozzle 12, the belt 13 can be operated at a somewhat higher speed than the rate at which the band is formed by extrusion from the nozzle 12. If it is desired to produce a somewhat thicker band of dough than would be produced by the extrusion nozzle, the conveyor belt 13 can be operated at a somewhat slower speed than that at which the dough is discharged from the extrusion nozzle 12, causing an accumulation of dough that will produce a somewhat thicker band. If the conveyor belt 13 is operated at the same speed as the dough is discharged from the extrusion nozzle 12, then the cross section of the band of dough 14 will be exactly that of the cross section of the orifice 15.

As the mass of raw dough as it comes from the mixer, that is deposited in the hopper 10, is not absolutely uniform in texture, it is desirable to exert sufficient rolling pressure on the extruded band of dough that the texture of the band that is to be made into the final product is of a uniform character throughout, as well as of uniform width and thickness. Due to the stickiness of the surfaces of the band of raw dough 14 as it leaves the extrusion nozzle 12, it is necessary to apply dusting flour to both faces of said band 14 in order that it will not stick to the conveyor belts of the machine and that rolling pressure can be applied thereto. A conveyor belt 16 is provided below the conveyor belt 13 and the upper run thereof moves in the direction indicated by the arrow in Fig. 1. It will be noted that the discharge end of the conveyor belt 13 is located above the conveyor belt 16 between the ends of the upper run thereof. In order to apply flour to both faces of the raw band of dough 14 a suitable flour sifter 17 is provided for applying dusting flour to the upper surface of the conveyor belt 13, and a similar flour sifter 18 is provided above the upper run of the belt 16 to apply dusting flour thereto. Due to the arrangement of conveyor belts 13 and 16 the band 14 of dough will be inverted as it passes from the band 13 to the belt 16, and accordingly flour will first be applied to the under face of the band 14 by means of the belt 13 as it leaves the extrusion nozzle 12 and the face of the band 14, which originally was the upper face thereof as it left the extrusion nozzle, by the belt 16. The floured band 14 of extruded raw dough passes from the conveyor belt 16 to a conveyor belt 19, which operates in the same direction as the conveyor belt 16, and is illustrated as inclining upwardly toward the discharge end thereof. The conveyor belt 16 preferably operates at the same lineal speed as the belt 13, and the conveyor belt 19 preferably operates at the same lineal speed as the belt 16.

The means for widening and flattening the band 14 and increasing the uniformity of texture thereof preferably comprises a roller 20, which is so mounted that it is exerting the pressure due to its own weight on the band of dough as it passes over the conveyor roller 21 on the conveyor 19, a pair of unflanged cooperating sheeting rollers 22 and 23, the spacing of which from each other is adjustable in a well known manner, and which are driven in any suitable manner in the direction indicated by the arrows thereon in Fig. 1, and a roller 24, which is similar in mounting to the roller 20 and which is mounted over a conveyor belt 25 to which the sheeting rollers 22 and 23 feed the band of dough. The rollers 20 and 24 are rotated in the direction indicated by the arrows thereon by the action of the conveyor belts 19 and 25, respectively. Each of said rollers 20, 22, 23 and 24 is provided with an outer tubular ply of polytetrafluoroethylene 26 extending over the dough engaging surface thereof, in order that the sticky dough engaging therewith will not adhere to said rollers. The band 14' of dough leaving the last of the flattening and sheeting rollers is of uniform width and thickness, but somewhat wider and thicker than the band 14 of raw dough that was discharged from the extrusion nozzle 12. It also has a smooth skin or surface thereon, due to the action of the sheeting rollers 22 and 23. The conveyor belt 25 operates in the direction indicated by the arrow thereon in Fig. 1, and may be operated at the same lineal speed as the surface speed of the rollers 22 and 23. If the continuous band of sheeted dough produced by the rollers 22 and 23 is narrower than desired, the belt 25 can be operated at a lineal speed that is less than that of the sheeting rollers 22 and 23, in which case the combined action of the conveyor belt 25 and the roller 24 will produce a wider band of dough than discharges from the rollers 22 and 23. If the band of sheeted dough produced by the rollers 22 and 23 is wider than is desired, the conveyor belt 25 can be run at a higher lineal speed than the speed of the rollers 22 and 23, stretching the band of dough so that it will be narrower than it was when it was discharged from between the rollers 22 and 23.

Figure 3:
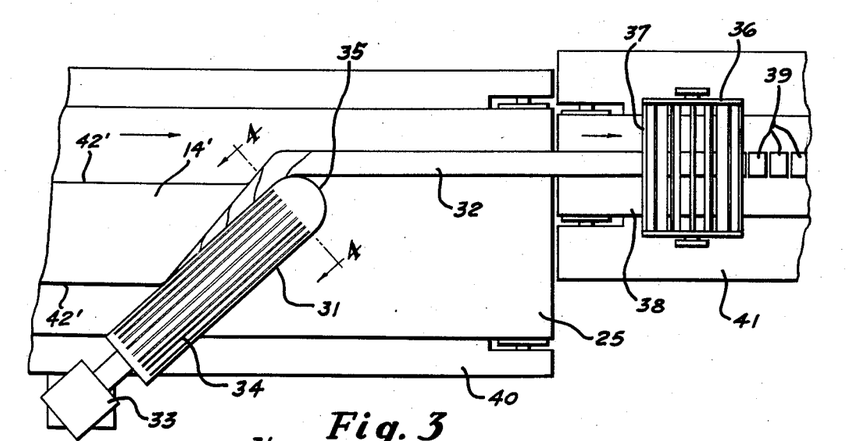
Fig. 3 is a similar fragmentary plan view of the apparatus shown in Fig. 1A.
Figure 4:
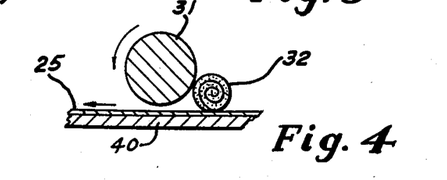
Fig. 4 is a fragmentary section taken on the line 4—4 of Fig. 3.

In the form of the invention illustrated in Figs. 1 and 1A the band of dough 14', which is of a uniform thickness and width, is first engaged by a roller 27 that applies a suitable edible oil to the upper surface of the band 14', and a suitable oil reservoir 28 and feeding means 29 are provided for supplying oil to the surface of the roller 27 in such a manner that it will be substantially uniformly applied thereto. The oiling roller 27 is mounted in a similar manner to the rollers 20 and 24 and is rotated in the direction indicated by the arrow thereon in Fig. 1 by the movement of the conveyor belt 25. Suitable means 30 is also provided for applying a coating or filling material to the band of dough that has had the oil applied thereto, which may be of any suitable character, usually including cinnamon, sugar, and such a dried fruit as raisins. Also cooperating with the conveyor belt 25 is a coiling roller 31, which transversely spirally coils up the band of dough 14' into a coil 32, as shown in Figs. 3 and 4. The coiling roller 31 is of a well known character and is driven in any suitable manner so as to be capable of adjustment angularly about the vertical axis of its mounting 33. Ordinarily the roller 31 is fluted, as indicated at 34, and has a rounded extremity 35. The coiling action of the roller 31 causes the dough to be displaced laterally of the belt 25, as illustrated in Fig. 3. Suitable rotating cutting means 36 having cutter members 37 thereon extending transversely of a conveyor belt 38, to which the belt 25 delivers the coil of dough 32, is provided, for transversely severing the coil 32 into sections 39, which are then, in the case of cinnamon rolls, turned over on their cut faces in panning the same.

Suitable table or backing members 40 are provided under the upper runs of the conveyor belts 13, 16, 19 and 25, and a table member 41 is similarly provided under the conveyor belt 38, the conveyor belts traveling in the direction of the arrows appearing thereon in Figs. 1, 1A, 2, 3 and 4. The rollers 20, 24 and 27 are mounted to permit them to move freely up and down in any well known manner, and the flour sifters 17 and 18 may be made in any well known manner for supplying an even coating of flour to the belts 13 and 16. The coating and filling material feeding device 30 may be of any well known character for distributing the material on the band of dough 14'. The roller 31 may be mounted in any desired well known manner for adjustment about a vertical axis so as to adjust the angularity thereof relative to the conveyor belt 25, and any suitable driving means for said roller 31, that will rotate the same in the direction indicated in Fig. 3, may be provided therefor. The cutting device 36 is mounted in any suitable manner for free rotation on its axis and is caused to rotate by the movement of the belt 38 in such a manner that the cutter blades 37 will engage the coil 32 at regular spaced intervals to divide the coil 32 into uniform lengths 39, the particular character of the flour sifting devices 17 and 18, feeding device 30, coiling device 29 and mounting of the rollers 20, 22, 23, 24, 27, 31 and 36, and the particular adjustable mounting and drive of the roller 31, not being a part of our invention.

Figure 2:
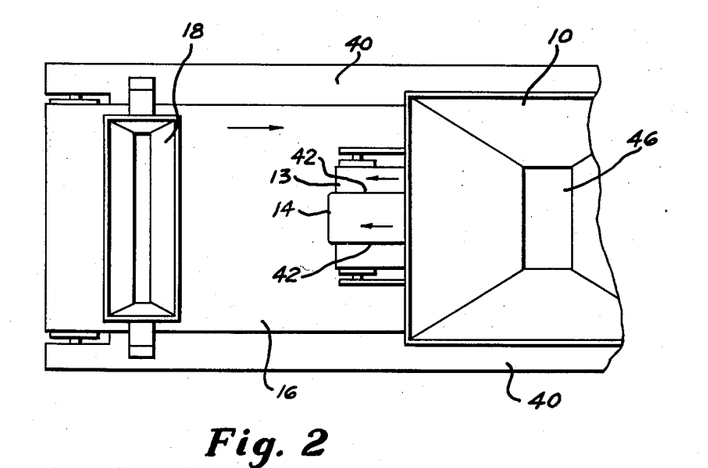
Fig. 2 is a fragmentary plan view of the left hand end of the machine shown in Fig. 1, on a somewhat larger scale than Fig. 1.

It will be noted upon reference to Fig. 2 that the band of dough 14 discharged from the extrusion nozzle 12 is of uniform width throughout its length, the side edges 42 thereof being straight and parallel. Similarly, upon reference to Fig. 5, it will be noted that the band 14 of dough extruded from the nozzle 12 is of uniform thickness from its point of discharge from the nozzle 12 to the belt 13. Said band will, of course, also be of uniform thickness throughout its length as it engages the belt 13 and as it is carried along by the belt 13 and the belts 16 and 19, and will have a uniform thickness and width when it reaches the roller 20, and inasmuch as the roller 20 exerts a uniform pressure on the band of dough 14 it will maintain a uniform width and thickness as it passes from the roller 20 to the sheeting roller 23 and will have a uniform thickness and width as it leaves the paired rollers 22 and 23 and moves into engagement with the belt 25, said band 14' that has been widened and flattened by the rollers 20, 22, 23 and 24 will also have uniform width and thickness whether the belt 25 travels at a higher, lower, or the same lineal speed as the rollers 22 and 23 as said band 14' travels from the roller 24 into engagement with the roller 27 and will continue to have such uniform cross section as it comes into engagement with the coiling roller 31, the side edges 42' of said strip 14' being straight and parallel, as shown in Fig. 3.

There is no serious problem involved in maintaining the uniform cross sectional character of the band 14 of raw dough and the band 14' of sheeted dough as it travels toward the roller 31, provided a continuous, uninterrupted, uniform band or strip of dough is continuously discharged under a uniform pressure from the extrusion nozzle 12. Our invention provides a method of feeding dough from a mass thereof that has come from a mixer, which is deposited in a suitable hopper so that this uniformity of discharge from the extrusion nozzle of the raw dough results.

The feeding device 11 provided for carrying out our inevntion comprises a housing portion 43, which has a cylindrical inner surface 44, which is curved concentrically about the axis of rotation of a rotating feeding means comprising a rotor 45. The hopper 10 is connected with an inlet or intake connection 46 leading into the upper portion of the housing portion 43. The rotor 45 has a cylindrical peripheral portion 47 which is concentrically curved about the axis of rotation thereof, and stationary means 48 is provided on the housing portion 43 extending inwardly from the cylindrical inner face 44 into engagement with the outer curved peripheral portion 47 of the rotor 45, said member 48 serving as partitioning means to provide ends in the passage 49 provided between the housing portion 43 and the rotor 45, said passage being of an annular character except for the inlet connection 46 and a manhole 50 provided with a suitable cover 50' for access to the interior of the feeding device.

Figure 7:
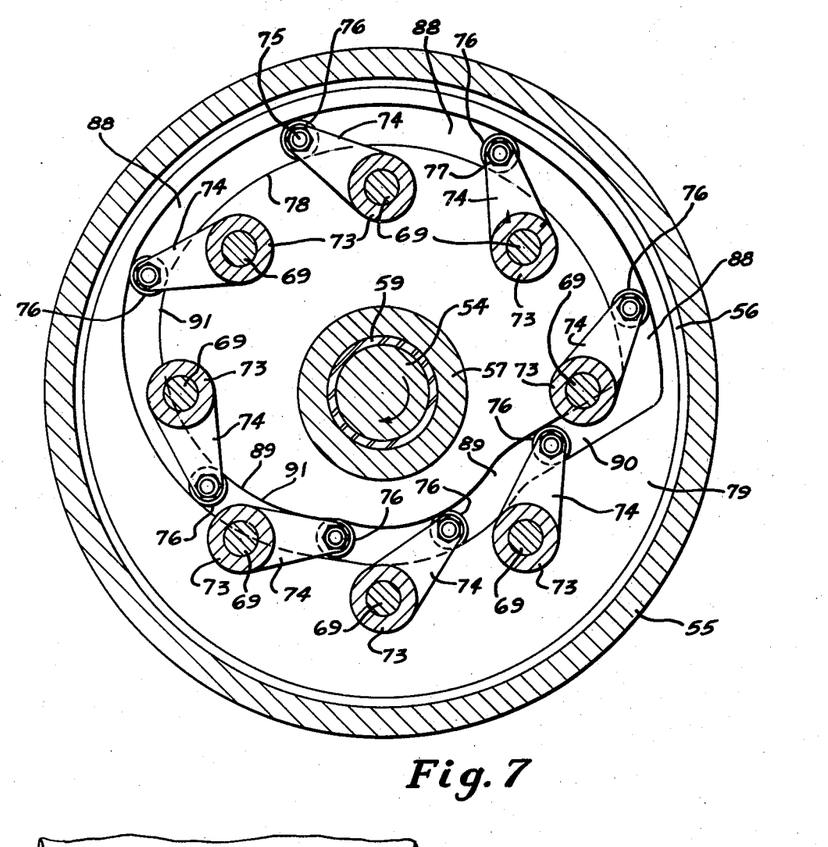
Fig. 7 is a vertical sectional view taken on the line 7—7 of Fig. 6.

The housing portion 43 is provided with an end wall 51. Suitable bearing mounting means 52 in the end wall 51 has anti-friction bearing means 53 provided therein for the shaft 54. The housing portion 55 has an end wall 56 that has a sleeve 57 extending inwardly therefrom, and a sleeve 58 extending outwardly therefrom, said sleeves having anti-friction bearing means 59 and 60 therein, respectively, for the shaft 54, said shaft being rotated at a constant rate by any suitable driving means, in the direction indicated by the arrow in Figs. 5 and 7.

The main body portion of the rotor 45 is of an annular character, having an inner cylindrical wall 61 that is spaced from the shaft 54. It is further provided with a pair of side plates 62 and 63, which are fixed on the shaft 54 and are fixed to the main body portion of the rotor so that said plates 62 and 63 and the main body portion 45 of the rotor rotate with said shaft 54 as a unit. Pockets or recesses 64 are provided on the rotor body portion 45, the side plates 62 and 63 forming the ends of said pockets or recesses. It will be noted that the pockets have curved wall portions 65 that are each curved about an axis that lies inside the peripheral wall 47 of the rotor, said pockets or recesses being thus partially cylindrical in character, with the greatest width thereof inwardly from the peripheral wall 47 of the rotor to thus provide openings in the periphery of the rotor into said pockets that are slightly smaller that the diameter of said pockets. The radius of curvature of the cylindrical wall portions 65 is such that they lie on the surface of a cylinder substantially tangent to the inner cylindrical surface 44 of the housing portion 43.

Rotatably mounted in the pockets or recesses 45 are vanes 66, which have outer curved surfaces 67 that have the same radius of curvature as the wall portions 65 of the pockets 64, and thus the wall portions 67 have a snug sliding fit with the wall portions 65. The pockets 64 are uniformly spaced around the rotor body 45, as will be obvious from Fig. 5. The vanes further have curved surfaces 68 thereon, that have the same radius of curvature as the periphery 47 of the body portion 45, and it will be obvious that when the rotatable vanes 66 are in the position shown for the lowermost vane in Fig. 5 and for the position thereof shown at the left of said lowermost position in Fig. 5, that the curved surfaces 68 of the vanes 66 will form a continuation of and lie on the same cylindrical surface as the periphery 47 of the rotor, the cross section of each of the vanes being exactly the same as that of the pockets 64 in which the vanes are mounted.

Means is provided for rotating the vanes about their axes to the various positions that the same assume during the rotation of the rotor 45 with the shaft 54. Said means for rotating said vanes comprises a shaft 69 extending into an axial opening 70 in each vane 66 and fixed thereto so that the vane rotates with said shaft. The side plate 63 is provided with tubular bearing portions 71 extending therefrom toward the wall 56 and having a bore 72 therein for receiving the shaft 69 rotatably, said bore 72 extending through the side plate 63. The shafts 69 extend toward the plate 56 beyond the extremities of the tubular bearing portions 71, and hubs 73 of cranks 74 are mounted in fixed position on said shafts 69. A shaft 75 is provided on each of the cranks 74 on which a roller 76 is rotatably mounted in a suitable manner, said shafts being fixed to the cranks by suitable means, such as the nuts 77. The rollers 76 are mounted in a cam slot 78 in the cam plate 79, which is mounted in an annular recess 80 in the wall 56 in fixed position.

Suitable sealing means is provided between the plate 62 and the housing comprising packing rings 81 mounted in a recess provided between the end wall 51 and the wall portion 43, the wall portion 43 having an annular V-shaped rib 82 thereon, with which one of said packing rings engages, and the end wall 51 having an annular rib 83 thereon, with which the other packing ring engages. A similar sealing means is provided between the side plate 63 and the wall portion 43 and an inwardly extending annular flange 84 on the wall portion 55, a V-shaped rib 82', similar to the rib 82, engaging one of said packing rings 81 and a flat face 85 on the annular flange 84 engaging the other of said packing rings 81. The flange 84 also has a rib 86 thereon seated against a shoulder on the wall portion 43. A fluid tight joint is thus provided between the rotor and the housing. It will also be noted that the inwardly extending annular rib 87 on the end wall 51 and the tubular portion 57 on the wall 56 serve as thrust bearings, which the side plates 62 and 63 on the rotor engage with a sliding fit, so that there is no movement of the rotor within the housing endwise of the shaft possible.

The cam groove or slot 78 has an outer portion 88 that is curved concentrically to the axis of rotation of the shaft 54, and an inner portion 89 that is curved concentrically to the axis of rotation of the shaft 54. An inclined portion 90 of said slot or groove extends abruptly inwardly from the right hand end of the slot or groove portion 88, as viewed in Fig. 7, to the right hand end of the groove or slot portion 89 as viewed in Fig. 7, and a gradually outwardly curving portion 91 of said cam slot or groove extends from the left hand end of the inner portion 89 thereof to the left hand end of the outer portion 88 thereof, as viewed in Fig. 7. Since the shaft 54 is rotating clockwise as viewed in Fig. 7, the rollers 76 will roll in said slot or groove in a clockwise path, passing from the groove or slot portion 88 to the groove or slot portion 90, and from the groove or slot portion 90 to the groove or slot portion 89 and then to the groove or slot portion 91.

Figure 5:
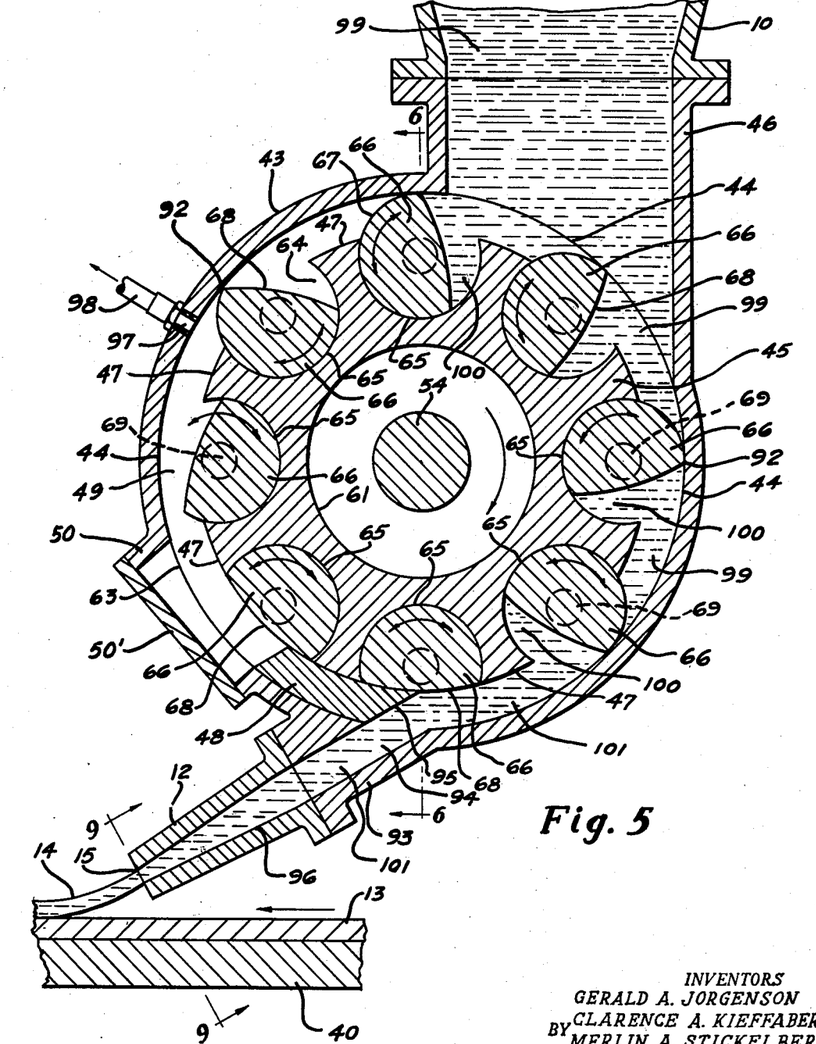
Fig. 5 is a vertical sectional view through the feeding and extruding means utilized in carrying out our method, the section being taken substantially on the line 5—5 of Fig. 6, portions of the machine being broken away.
Figure 6:
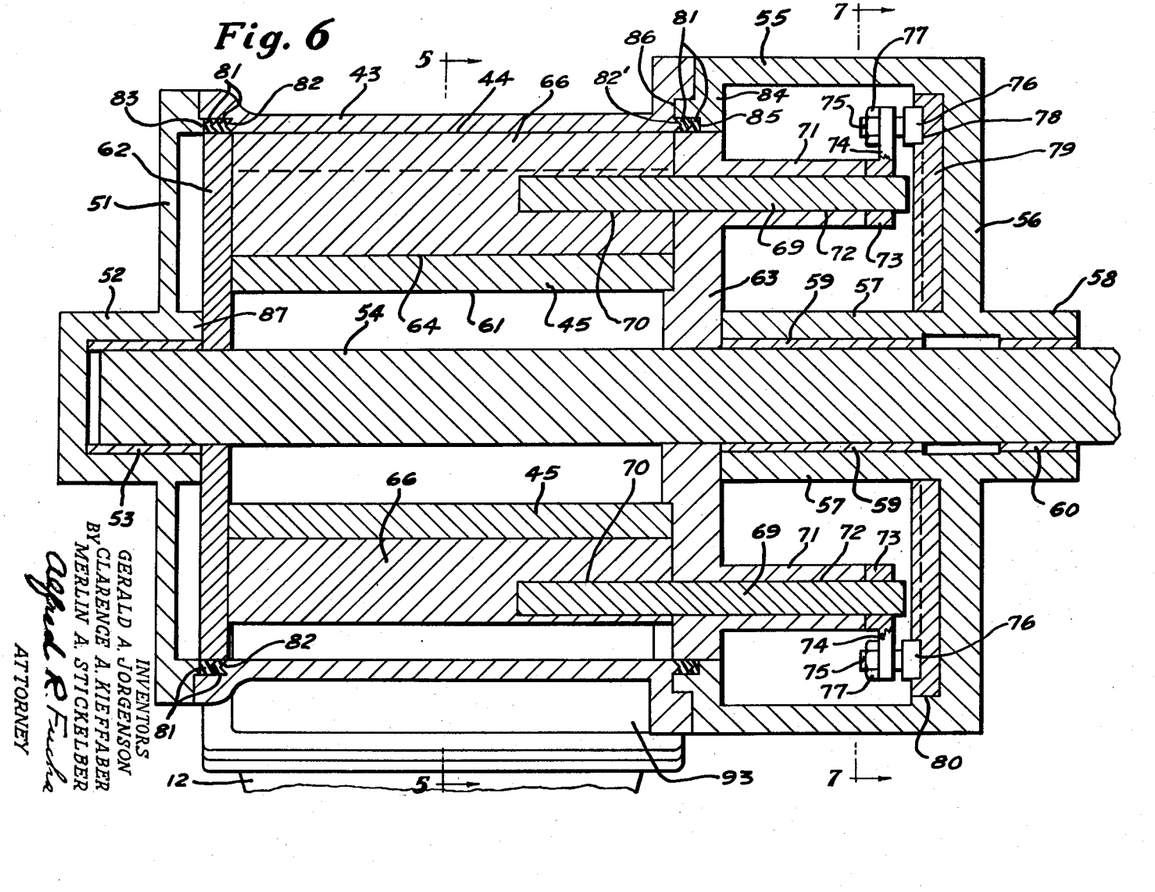
Fig. 6 is a vertical sectional view taken substantially on the line 6—6 of Fig. 5, partly broken away.

The cranks 74 are so arranged relative to the shafts 69 that when the rollers 76 are in the portions 88 of the cam groove 78 the vanes 66 will be in their position of greatest outward projection, with the junction 92 of the curved walls 68 and 67 in engagement with the curved surface 44 of the housing portion 43, while, when the rollers are in the groove portions 90 the cranks 74 swing to such a position that the vanes are rapidly withdrawn into the pockets or recesses in the rotor into the position shown for the lowermost vane 66 in Fig. 5. When the rollers 76 reach the groove portion 89 the vanes are completely housed in the pockets or recesses in the rotor and the position of the groove portion 89 is such that this occurs shortly after the vane 66, shown to the right of the lowermost vane in Fig. 5, moves clockwise from the position thereof shown in Fig. 5, the vanes 66 thus being completely housed in the pockets when the same reach the position of the member 48. This position is maintained as long as the roller 76 of a particular vane is in the portion 89 of the groove, which position is maintained until after the member 48 has been passed. When the rollers enter the groove portion 91 the vanes are gradually moved outwardly from the position of being housed completely in the pockets to the projected position, with the corner 92 thereof in engagement with the curved surface 44.

The housing portion 43 has a discharge connection 93 leading from the annular passage 49 existing between the rotor 45 and the housing portion 43, said connection extending downwardly at an oblique angle so as to extend in the direction of travel of the belt 13 at an oblique angle thereto. The discharge connection 93 has a passage 94 therein connecting with the annular passage 49 and having the same cross section as said passage 49. The partitioning member 48 has an obliquely extending wall portion 95 that aligns with the wall of the passage 94 at one side thereof to direct the flow of dough in the feeding device into the passage 94. The nozzle 12 is secured to the discharge connection 93 and has a gradually narrowing passage 96 therein that extends from and is a continuation of the passage 94, terminating in the discharge slot or orifice 15. The extrusion nozzle 12 extends also at an oblique angle to the belt 13, as will be obvious from Fig. 5. Extending through the wall of the housing portion 43 is a suction connection 97, from which a suitable pipe or conduit 98 leads to a suitable suction pump.

While the corner portions 92 of the vanes 66 slidably engage the inner face 44 of the housing 43 in the feeding position thereof, air can escape between said corner portions of said vanes and the inner face 44 of the wall portion 43. Accordingly there will be a zone within the housing between the housing and the rotor in which the pressure will be below atmospheric, which will extend counter-clockwise from the inlet connection 46 to the partition member 48. The mass of dough in the hopper 10 is indicated by the numeral 99. The purpose of the suction connection 98 is to completely fill the pocket portions 100 lying between the curved walls 65 of the pockets or recesses and the curved walls 68 of the vanes and the pocket that exists between the wall 68 adjacent the corner portion 92 and the curved face 44 of the housing.

It is necessary that all these spaces be completely filled with the dough, as shown in Fig. 5 of the drawings, as the vanes 66 pass into the portion of the passage 49 that lies between the inlet 46 and the partition 48. Due to the provision of the suction means, this complete filling of the passage and the pocket portions adjacent the passage in the rotor is accomplished by the dough 99 that has been drawn into the feeding means from the hopper. Accordingly there will be a steady stream of dough 101 forced or pushed by the vanes 66 toward the extrusion nozzle 12 and into the same, and this dough will be put under pressure dependent upon the restriction of the passage created by the tapering portion 96 of said passage in the nozzle 12. It will be noted that due to the shape of the rotating vanes 66 the portions of said vanes that project from the rotor in the feeding position thereof occupy exactly the same space in the passage that is provided by the pocket portions 100 in the pockets or recesses 64 provided by the rotation of the vanes into the feeding position. Accordingly when the vane 66 to the right of the bottom of Fig. 5 moves into the position in which it is completely housed in its pocket, the amount of dough pushed out of the pocket 100 is exactly the proper amount to fill the space that was occupied by the protruding portion of the vane 66. There is thus no interruption whatsoever in the steady feeding of the dough 99 from the hopper at a uniform rate to the extrusion nozzle providing the steady uniform stream 101 above referred to.

In carrying out our method the raw dough is placed in the hopper 10 from the mixer and feeds by gravity through the inlet 46 to the rotor. The rotor rotates in a clockwise direction as viewed in Fig. 5, and the portion of the space between the rotor and the housing from the vane approaching said inlet to the discharge passage 94 constitutes the feeding sector of said annular space. The space on the other side of the partition 48 into which the suction connection 98 leads is, as has been previously pointed out, kept below atmospheric pressure up to the vane 66 that is nearest the inlet connection 46, thus drawing the dough 99 into the pocket between the said vane and the preceding one immediately after the preceding vane has passed into a position opposite the opening from the inlet connection 46. The dough between the vane 66 from the inlet connection to the lower portion of the housing is pushed constantly toward the outlet 94 and the last vane that is in projected position prior to reaching the partitioning means 48 pushes all of the dough ahead of it in a steady stream into the outlet 94, this continuing with each succeeding vane 66 so that a continuous stream of dough is fed at a uniform rate into the outlet passage 94 and into the passage 96 of the extrusion nozzle 12. The extrusion nozzle 12 is removable and can be replaced by other extrusion nozzles, dependent upon what is desired as to the cross sectional shape of the band of dough passing from the orifice 15. Each extrusion nozzle will, of course, produce only a band of dough of a definite width and thickness.

The continuous uniform band of raw dough 14 that is extruded onto the belt 13 is then floured on both sides and moved forward by means of the conveyor belts 13, 16 and 19 to the widening and flattening rollers 20, 22, 23 and 24 and is further operated on in the manner above described to form cinnamon rolls, or otherwise operated on to produce other bakery products that are produced from a wide, flat continuous band of dough of uniform width and thickness.

What we claim is:

1. In the method of making bakery products, continuously withdrawing dough from a mass of raw dough, subjecting said dough to a pressure below atmospheric during withdrawal from said mass, subjecting said withdrawn dough to pressure above atmospheric while advancing said dough at a uniform rate in a uniform stream toward an orifice, extruding said raw dough in a continuous wide flat band of uniform width and thickness from said orifice at a uniform rate to suddenly reduce the pressure, to atmospheric to which said dough is subjected, said band being of much greater width than thickness, and moving said band of raw dough continuously away from said orifice at a uniform rate approximating that at which said band of dough is being discharged from said orifice.

2. In the method of making bakery products, continuously withdrawing dough from a mass of raw dough by suction to subject said dough to a pressure below atmospheric during withdrawal from said mass, subjecting said withdrawn dough to pressure above atmospheric while advancing said dough at a uniform rate in a uniform stream toward an orifice, extruding said raw dough in a continuous wide flat band of uniform width and thickness from said orifice at a uniform rate to suddenly reduce the pressure to atmospheric to which said dough is subjected, said band being of much greater width than thickness, moving said band of raw dough continuously away from said orifice at a uniform rate approximating that at which said band of dough is being discharged from said orifice, and exerting uniform rolling pressure on said moving band of dough to produce a continuous band of dough of uniform texture, width and thickness.

3. In the method of making bakery products, continuously withdrawing dough from a mass of raw dough, subjecting all said dough to a uniform pressure below atmospheric during withdrawal from said mass, subjecting said withdrawn dough to pressure above atmospheric while advancing said dough at a uniform rate in a uniform stream toward an orifice, extruding said raw dough in a continuous wide, flat band of uniform width and thickness from said orifice at a uniform rate to suddenly reduce the pressure to atmospheric to which said dough is subjected, moving said band of raw dough continuously away from said orifice at a uniform rate approximating that at which said ribbon of dough is being discharged from said orifice, applying dusting flour first to one face of said band of raw dough and then to the other face thereof and exerting uniform rolling pressure on said moving band of raw dough after application of dusting flour to both faces thereof.

4. In the method of making bakery products, withdrawing dough from a mass of raw dough continuously by suction, moving said withdrawn dough continuously toward an extrusion orifice by applying a uniform pressure thereto, extruding said raw dough under pressure through said orifice in a continuous flat band of uniform width and thickness at a uniform rate, said band being of much greater width than thickness, conveying said extruded band of raw dough away from said orifice at a rate approximating the rate of extrusion thereof, and progressively applying uniform rolling pressure to said band.

5. The method of producing a ribbon-like continuous wide flat strip of dough of a predetermined uniform width and thickness and of uniform texture comprising extruding raw dough under uniform pressure at a uniform rate in a continuous wide flat band of a uniform width approaching said predetermined width and a uniform thickness approaching said predetermined thickness, applying dusting flour to both faces of said band, and exerting uniform rolling pressure on said band after application of dusting flour to both faces thereof to reduce the thickness of said band uniformly to said predetermined thickness and the width thereof uniformly to said predetermined width.

6. The method of making cinnamon rolls comprising continuously withdrawing raw dough from a mass thereof, subjecting said dough to a pressure below atmospheric during withdrawal thereof, subjecting said withdrawn dough to pressure above atmospheric while advancing said dough at a uniform rate in a uniform stream toward an orifice, extruding said raw dough in a continuous wide, flat band of uniform width and thickness from said orifice at a uniform rate to suddenly reduce the pressure to atmospheric to which said dough is subjected, said band being of much greater width than thickness, moving said band of raw dough continuously away from said orifice at a uniform rate approximating that at which said band of dough is being discharged from said orifice, applying dusting flour first to one face of said band of raw dough and then to the other face thereof, exerting uniform rolling pressure on said moving band of dough after applying said dusting flour to both faces thereof to produce a band of dough of uniform texture, width and thickness, applying coating and flavoring materials to one face of said band of dough, continuously transversely coiling said band of dough and severing said coil transversely into sections.

References Cited in the file of this patent

UNITED STATES PATENTS

| | | |
|---|---|---|
| Re. 22,399 | Fonken | Dec. 7, 1943 |
| 472,765 | Mitchell | Apr. 12, 1892 |
| 893,005 | Mitchell | July 14, 1908 |
| 1,337,152 | Peters | Apr. 13, 1920 |
| 2,337,539 | Buechek | Dec. 28, 1943 |
| 2,440,655 | Hahn | Apr. 27, 1948 |
| 2,577,925 | Sternbach | Dec. 11, 1951 |
| 2,740,362 | Elliott | Apr. 3, 1956 |